April 15, 1930.  L. E. HILDEBRAND  1,755,117
METHOD OF CALIBRATING INSTRUMENTS
Filed April 3, 1928
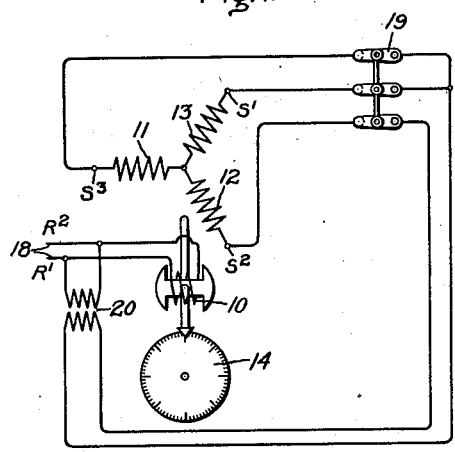
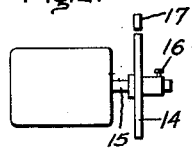
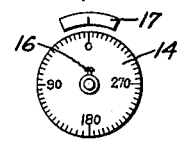
Inventor:
Lee E. Hildebrand,
by Charles V. Mullen
His Attorney.

Patented Apr. 15, 1930

1,755,117

UNITED STATES PATENT OFFICE

LEE E. HILDEBRAND, OF MARBLEHEAD, MASSACHUSETTS, ASSIGNOR TO GENERAL ELECTRIC COMPANY, A CORPORATION OF NEW YORK

METHOD OF CALIBRATING INSTRUMENTS

Application filed April 3, 1928. Serial No. 267,124.

My invention relates to a method of calibrating instruments or devices used in the transmission of angular motion and has for its object a simple and reliable method of calibrating whereby the instrument may be thereafter connected together in a predetermined relation.

My invention has particular application to instruments for the transmission of angular motion provided with an alternating current field winding inductively cooperating with a polycircuit armature winding. It will be understood that a system for transmitting motion with these instruments involves the use of a sending or transmitting instrument and one or more receiving instruments having their armature windings electrically connected thereto, the field windings of the two instruments being connected to a suitable alternating current source of supply whereby electromotive forces are induced in the armature windings which electromotive forces produce currents when unbalanced whereby a torque is applied to the rotor of the receiver causing it to turn to a position of voltage balance which is the position of angular agreement with the transmitter. Each instrument carries a dial or other indicating member and it is desired that when the instruments are in angular agreement the dial of the receiving instrument should show the same reading as the dial of the transmitting instrument. The most common method of accomplishing this is to set the dials to give some indication after the instruments have been connected together. In one of its aspects my invention relates to a method of calibrating the individual instruments, as a result of which the dials are secured to the instruments in such relation and whereby the instruments may be electrically connected together in such manner that when the electrical connections are made the receiver will immediately turn to a position in which its dial has the same reading as the dial of the transmitter, no subsequent setting of the dials being required.

In carrying out my invention in connection with an instrument provided with a three circuit armature winding having three terminals and a single circuit field winding, I connect the armature winding to an alternating electrical supply source, two predetermined armature terminals being connected to one side of the supply source and the other armature terminal being connected to the other side of the supply source, and apply an electromotive force to the field winding whereby the rotor is caused to turn by electromagnetic repulsion to a predetermined position relative to the armature. After thus setting the rotor in this predetermined position, I secure the indicating dial to the rotor in a predetermined angular relation thereto.

For a more complete understanding of my invention reference should be had to the accompanying drawing in which Fig. 1 is a diagrammatic representation of means for calibrating instruments embodying my invention; Fig. 2 is a simplified side elevation of a typical transmitting or receiving instrument; and Fig. 3 is a simplified end elevation of a typical transmitting or receiving instrument.

Referring to the drawing, I have shown my invention in one form with reference to the calibration of an instrument for transmitting angular motion provided with a single circuit field winding 10 mounted on a rotor member and inductively cooperating with a polycircuit armature winding mounted on the stator, this armature winding being shown as comprising three coils 11, 12 and 13, electrically connected in a Y or star connection, and being physically similar to a Y connected bi-polar three phase armature winding. The terminals of the field windings are brought out in a definite relation with respect to the stator of the instrument, and in accordance with my invention I number these terminals in a definite order, for example, in a clockwise direction when facing a definite end of the instrument, such as the slip ring end. As shown, the terminals of the field winding are numbered $R^1$ and $R^2$, while the armature terminals are numbered $S^1$, $S^2$ and $S^3$ in this order. The object of this is to assure that the terminal having a given marking will in any instrument lead to a predetermined field or armature terminal. With the terminals of all the instruments thus marked, any two instruments may obviously be connected together in a predetermined relation by interconnecting the armature terminals having the same markings.

It is necessary however, that the indicating member of each instrument be secured to the rotor of that instrument in a predetermined angular relation, in order that the two members will give the same reading when the instruments are connected together. As shown in Figs. 2 and 3, a suitable calibrated dial 14 is secured to the rotor shaft 15 of the instrument. A clamping screw 16 is provided in the hub of the dial 14 whereby the dial may be loosened and secured in any desired angular position on the shaft. The dial 14 cooperates with a suitable fixed reference mark 17 which mark is secured to the stator of the instrument.

In making the setting of the dial, the rotor is first set in a predetermined zero position which is accomplished by connecting the terminals of a predetermined pair of armature coils to one side of a source of electrical supply 18 indicated as an alternating current source of supply and connecting the third armature coil to the other side of the alternating current source of supply. As shown, the terminals $S^1$ and $S^3$ of the coils 11 and 13 are connected to one side of the supply source 18 and the terminal $S^2$ of the coil 12 is connected to the other side of the supply source 18. A disconnecting switch 19 is interposed in the connections between the armature windings and the supply source whereby the windings may be connected to and disconnected from the source as desired. The voltage impressed upon the armature winding preferably should be substantially equal or equivalent to the electromotive force which would be induced in the armature winding by the field winding, when the field winding is energized from the supply source 18 and turned to the predetermined zero position in which it is to be set. Ordinarily the electromotive forces induced in the armature windings are considerably lower than the electromotive forces applied to the field winding. As shown a stepdown transformer 20 is interposed between the armature winding and the source of supply 18 to effect this voltage relation. In calibrating the instrument, the switch 19 is closed to connect the armature winding to the supply source 18 and at the same time the field winding 10 is connected to the supply source. This causes the rotor, by reason of the electro-magnetic repulsion between the two windings to turn to a predetermined position relative to the armature winding, i. e., the position assumed by the rotor in which the magnetic fields generated by the field and armature windings align themselves in opposed relation.

After the rotor has thus been brought to its zero position, the dial 14 is secured to the rotor shaft in a predetermined position, such as the zero position with reference to the mark 17.

In the previous description it will be noted that the predetermined zero position of the rotor has been taken as the position it assumes when the terminals $S^1$ and $S^3$ have been connected to one side of the supply source and the terminal $S^2$ has been connected to the other side of the supply source. It will be understood, of course, that this position has been chosen arbitrarily and that various other positions may be taken as the zero position; also other positions may be determined as a means for calibrating the instrument for several different positions.

The above described method may be employed to calibrate a transformer instrument, such as shown in Fig. 6 of Patent No. 1,554,915, to Hewlett and Willard, dated September 22, 1925, by using one of the armature windings of the transformer as a field winding. For example, where each winding comprises three legs connected in Y relation, two of the terminals of one of the windings, for example, the winding on the rotor member, will be connected together and connected to one side of the supply circuit, while the other terminal of the winding will be connected to the other side of the supply circuit. In like manner two of the terminals of the other of the windings will be connected to one side of the supply circuit while its other terminal will be connected to the other side of the supply circuit. Fields are generated by the windings and consequently may be regarded for calibration purposes as the equivalent of those generated by the field winding 10 and by the armature windings comprising the coils 11, 12, and 13. The instrument is then calibrated by proceedings as previously described.

While I have described my invention as embodied in concrete form and as operating in a specific manner in accordance with the provisions of the Patent Statutes, it should be understood that I do not limit my invention thereto since various modifications thereof will suggest themselves to those skilled in the art without departing from the spirit of my invention, the scope of which is set forth in the annexed claims.

What I claim as new and desire to secure by Letters Patent of the United States is:

1. The method of calibrating an instrument for the transmission of angular motion provided with a field winding and a polycircuit armature winding in inductive relation with said field winding, one of said windings being rotatably mounted and connected to drive indicating means, which consists in impressing an electromotive force on said field winding and at the same time on said armature winding so as to cause said rotor to be turned by electromagnetic repulsion to a predetermined zero position, and then setting said indicating means in a predetermined position by adjusting it independently of said rotatable winding.

2. The method of calibrating an instrument for the transmission of angular motion provided with a field winding and a polycircuit armature winding in inductive relation with said field winding, one of said windings being rotatably mounted and connected to drive indicating means, which consists in connecting portions of said armature winding to an alternating current source of supply while impressing an alternating electromotive force on said field winding so as to cause said rotor to be turned by electromagnetic repulsion to a predetermined zero position, setting said indicating means in a predetermined position by adjusting it independently of said rotor, and then connecting said indicating means to said rotor in a fixed driving relation therewith.

3. The method of calibrating an instrument for the transmission of angular motion provided with a field winding and a polycircuit armature winding in inductive relation with said field winding, one of said windings being mounted on a rotor member, and an indicating device driven by said rotor member, which consists in marking the terminals of said windings in a predetermined order, applying an alternating electromotive force to said field winding and at the same time to said armature winding so as to cause said rotor to be turned by electromagnetic repulsion to a predetermined position, and then setting said indicating means in a mechanical predetermined position.

4. The method of calibrating an instrument for the transmission of angular motion provided with a field winding and a polycircuit armature winding in inductive relation with said field winding, one of said windings being rotatably mounted and connected to drive indicating means, which consists in impressing an alternating electromotive force on said field winding while impressing electromotive forces upon said armature winding substantially equivalent to those induced in said armature winding due to said field winding at a predetermined arbitrary position so as to cause said rotor to be turned by electromagnetic repulsion to a predetermined position, and then setting said indicating means in a predetermined indicating position.

5. The method of calibrating an instrument for the transmission of angular motion comprising a single circuit field winding on a rotor element, indicating means driven by said rotor, and a three circuit armature winding on a stator element provided with three terminals, said armature winding being inductively related with said field winding, which consists in marking the terminals of said field and armature windings in a predetermined order, impressing an alternating electromotive force on said field winding while connecting two of said stator terminals together and to one side of an alternating current source of supply and connecting the other stator terminal to the other side of the alternating current source of supply so as to cause said rotor to be turned by electromagnetic repulsion to a predetermined zero position, and then setting said indicating means in a predetermined indicating position.

In witness whereof, I have hereunto set my hand this 30th day of March, 1928.

LEE E. HILDEBRAND.